G. C. BOOTH.
FEED-BAGS FOR HORSES.
No. 186,301.            Patented Jan. 16, 1877.
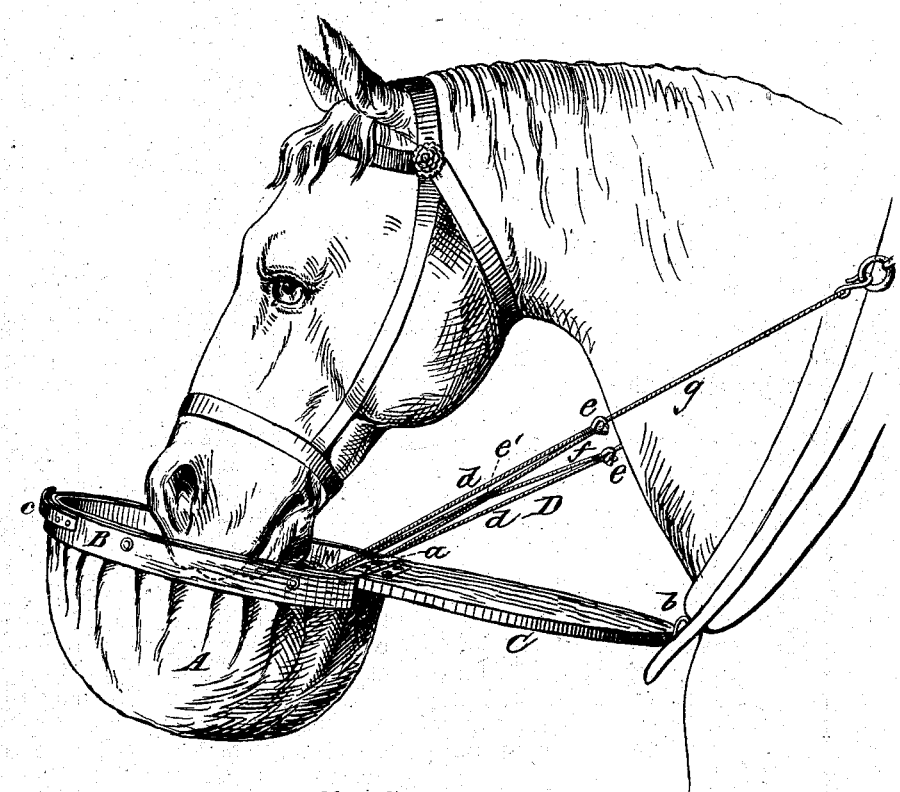
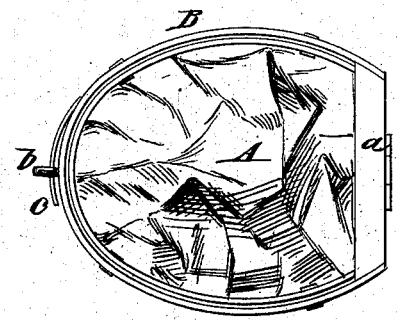

UNITED STATES PATENT OFFICE.

GEORGE C. BOOTH, OF NEW YORK, N. Y., ASSIGNOR TO HIMSELF AND ROBERT GIBSON, OF SAME PLACE.

IMPROVEMENT IN FEED-BAGS FOR HORSES.

Specification forming part of Letters Patent No. 186,801, dated January 16, 1877; application filed September 2, 1876.

*To all whom it may concern:*

Be it known that I, GEORGE C. BOOTH, of the city, county, and State of New York, have invented a new and Improved Feed-Bag for Horses, of which the following is a specification:

Figure 1 is a perspective view, showing the invention and manner of using it. Fig. 2 is a bottom view of the feed-bag.

My invention consists in an arrangement of a feed-bag, the mouth of which is attached to a band or hoop of wood or iron, to which is hinged a cover for closing the bag, and which, when the bag is in use, acts as a stay or brace for holding the bag in the required position, being hooked into the hame or breast straps of the harness. It further consists in a peculiar arrangement of cords for sustaining the bag, by which it is prevented from swinging, and is held steadily.

Referring to the drawing, A is a bag of canvas or other suitable material, which is riveted or otherwise attached to a hoop, B, of wood or iron, which is thickened and flattened at $a$ to receive the hinge of the cover C, which is of such form as to close over the hoop B and cover the bag. A hook, $b$, is attached to the outer edge of the cover, which is notched to engage with a spring, $c$, attached to the hoop when the bag is closed, and is hooked into the hame or breast strap when the bag is open, forming a brace for holding the bag the required distance from the body of the horse. D is an arrangement of cords for sustaining the bag at the proper height, which consists of the cords $d\ d'$, attached to the inside of the hoop at the ends of the straight portion, and formed into a loop at $e$, tied together at $e'$, forming the diagonal stays $f$, and the cord $g$, having a hook at its upper end for attachment to some portion of the collar, or to the saddle of the harness, and passing through the loop $e$ and retained by a knot.

It is obvious that the bag is always in the position required for feeding. It throws no impediment in the way of breathing. It can be readily attached and detached. It folds compactly with or without the feed contained. The annoyance to the horse of inhaling the dust of the feed is entirely obviated, and the head is relieved of the weight of the bag, giving freedom of motion to the horse's head, avoiding the wasting of feed by the movement of the head.

If desired, the brace C may be hooked into or attached to the collar or other parts of the harness, so as to sustain the bag, thus dispensing with the cords D.

Having thus described my invention, I claim as new and desire to secure by Letters Patent—

1. A feed-bag consisting of a bag of canvas attached to a hoop of wood or iron, to which is hinged a cover having a hook for engaging with a portion of the harness, and a support of cords for attachment to the collar or saddle of a harness, substantially as herein shown and described.

2. A feed-bag for horses, supported by the brace C, adapted for rigid attachment to the collar, breast-strap, or hames of the harness, as herein set forth.

GEORGE C. BOOTH.

Witnesses:
C. SEDGWICK,
ALEX. F. ROBERTS.